United States Patent [19]
Daniel et al.
[11] 4,353,119
[45] Oct. 5, 1982

[54] ADAPTIVE ANTENNA ARRAY INCLUDING BATCH COVARIANCE RELAXATION APPARATUS AND METHOD

[75] Inventors: Sam M. Daniel, Tempe; Louis A. McRoberts, Scottsdale, both of Ariz.

[73] Assignee: Motorola Inc., Schaumburg, Ill.

[21] Appl. No.: 159,027

[22] Filed: Jun. 13, 1980

[51] Int. Cl.³ ........................ H04B 7/00; G06F 15/20

[52] U.S. Cl. ............................ 364/517; 343/100 LE; 364/574; 364/724; 364/735

[58] Field of Search ............... 364/517, 572, 573, 574, 364/724, 735; 343/100 R, 100 LE

[56] References Cited

U.S. PATENT DOCUMENTS

| | | | |
|---|---|---|---|
| 3,938,153 | 2/1976 | Lewis et al. | 364/517 |
| 3,938,154 | 2/1976 | Lewis | 364/517 |
| 4,117,538 | 9/1978 | Shrader et al. | 364/724 |
| 4,173,759 | 11/1979 | Bakhru | 343/100 LE |
| 4,217,584 | 8/1980 | Lombardi et al. | 364/574 |
| 4,217,586 | 8/1980 | McGuffin | 343/100 LE |
| 4,255,791 | 3/1981 | Martin | 364/574 |

*Primary Examiner*—Charles E. Atkinson
*Attorney, Agent, or Firm*—Eugene A. Parson

[57] ABSTRACT

A directional main antenna and N omnidirectional auxiliary antennas connected to each supply an m-sample batch of signals to apparatus for developing a weighting vector 2 through Batch Covariance Relaxation apparatus, which weighting vector is then used to weight the signals from the auxiliary antennas and the weighted outputs are summed with the signal from the main antenna to suppress undesired sidelobe interferences. The processor includes apparatus performing complex vector dot product multiplication, dividing apparatus, apparatus for adding or subtracting to provide the recursive updating of vectors and memories for storing the various signals between operations.

12 Claims, 4 Drawing Figures

FINAL w TO COMBINER
RAM
C
b
PE
PCC
PMR
SCALER
SE1
CONTROL
SCALE SIGNAL
BUS CONN.
AU
+/−
ASC1
ASC2
CE
SCALER
CONTROL
PU
SCALER
SE3
SCALE SIGNAL
BUS CONN.
CBA
SCALER
SE4
CLKX2
CLKY2
MR
MW
M0
M1
SYSTEM TIMING AND CONTROL
GLOBAL SCALING AND CONTROL
TIMING COMMANDS
SCALE SIGNALS
SCALE COMMANDS
CLKX1
CLKY1
CLKM1
RS
CONJ
RA
RB
GW1
Rx

ADAPTIVE ANTENNA ARRAY INCLUDING BATCH COVARIANCE RELAXATION APPARATUS AND METHOD

BACKGROUND OF THE INVENTION

In many applications sophisticated electronics are utilized to automatically solve a complex system of linear equations involving a Hermitian matrix. Generally, real time quadratic optimization problems that arise in linear and nonlinear estimation lead to such a system of equations. Some specific examples of apparatus involving such problems include adaptive antenna array processing, speech processing, spectral estimation, CAT scanning, picture processing, trajectory estimation, etc. For purposes of this disclosure, adaptive antenna array processing systems are disclosed but it should be understood that the disclosed apparatus and processes may be adapted to operate with any of the above described systems.

A complex system of linear equations involving a Hermitian matrix may be solved by means of an approach known as Sample Matrix Inversion (SMI), involving the inversion of the Hermitian matrix. However, this approach is generally extremely complicated and apparatus for mechanizing it is generally complicated and expensive. The present approach, referred to as the Batch Covariance Relaxation (BCR) approach, is much simpler to implement and, if a plurality of BCR modules are used in parallel, i.e., time-multiplexed, or are cascaded, the operating time of the processing may be the same, or even reduced, in comparison to the operating time required in the SMI system.

SUMMARY OF THE INVENTION

The present invention pertains to apparatus for providing a real time solution to a complex linear system of N equations in N unknowns, $CW+b=0$, that results from some quadratic optimization problem. Specifically, the present invention includes a means of generating the NxN complex Hermitian covariance matrix C and the forcing N-vector b from gathered multisensor data and subsequently produces the desired solution w by means of a BCR processor which is designed to accept C and b and yield w. The present invention includes an additional means for combining the multisensor data by weighting them appropriately with w, removing this way undesired components in the original data.

The invention further pertains to the above described apparatus in conjunction with an adaptive antenna array wherein the apparatus is utilized to adjust the weight of signals supplied by N omnidirectional auxiliary antennas and the adjusted signals are added to the signals from a main directional antenna to substantially eliminate or suppress unwanted signals.

The invention further pertains to an interative process for generating electrical signals representative of the complex weighting vector and the steps leading to the production of the electrical signals representative of the complex weighting vector.

It is an object of the present invention to provide new and improved apparatus for providing a real time solution to a complex system of N linear equations involving a $N \times N$ complex Hermitian matrix.

It is a further object of the present invention to provide new and improved apparatus for providing a real time solution to a complex system of N linear equations involving an $N \times N$ complex Hermitian matrix in conjunction with an adaptive antenna array system.

It is a further object of the present invention to provide an interative process for generating electrical signals representative of a complex weight N-vector, w, satisfying the linear system of N complex equations, $Cw+b=0$, where electrical signals C represent an $N \times N$ complex Hermitian covariance matrix and electrical signals b represent a complex forcing N-vector.

These and other objects of this invention will become apparent to those skilled in the art upon reconsideration of the accompanying specification, claims and drawings.

BRIEF DESCRIPTION OF THE DRAWINGS

Referring to the drawings, wherein like characters indicate like parts throughout the Figures.

DESCRIPTION OF THE PREFERRED EMBODIMENT

Figure 1:
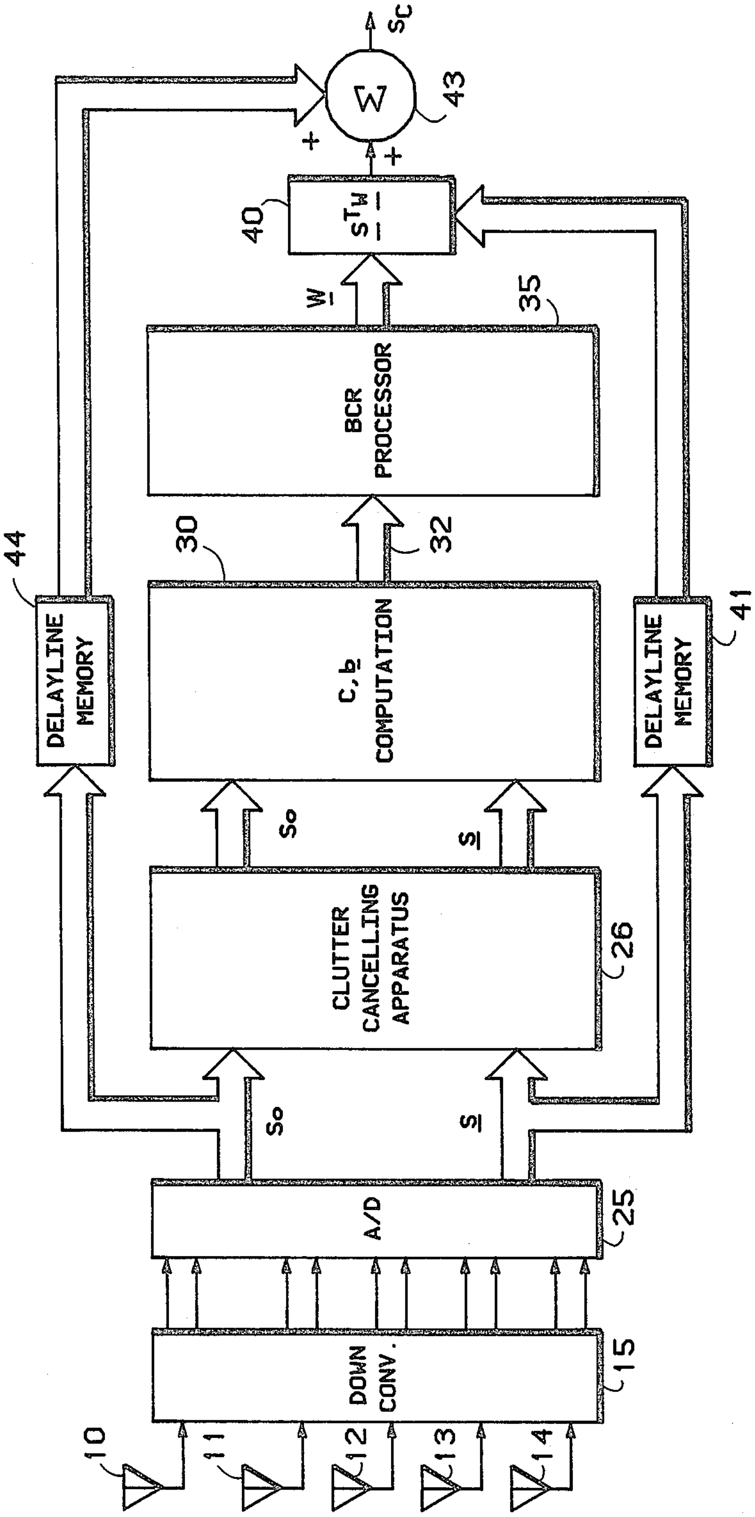
FIG. 1 is a block diagram of an adaptive antenna array embodying the present invention.

Referring specifically to FIG. 1, a main narrow beam, low-sidelobe directional antenna 10 and a plurality, N (which in the present embodiment is 4), of omnidirectional antennas 11, 12, 13 and 14 supply received signals to a down-converter 15. The down converter 15 is generally used to translate the operating frequency band at RF to a convenient frequency band at IF or even down to baseband as is the case in the present invention. Down-conversion is generally accomplished in a number of stages from RF through at least one IF and finally to baseband. At baseband down-conversion yields in-phase and quadrature outputs by appropriate mixing with a local oscillator at 0° and 90°. These resulting I and Q outputs constitute complex baseband signals from the main and auxiliary antennas. These signals are subsequently sampled (at the Nyquist rate or higher) by means of an analog-to-digital conversion unit 25, consisting of a bank of 2(N+1) individual A/D converters which represent the corresponding input signals in binary format by means of a plurality of bits (for example, 10). Note that down-converter 15 and A/D converter 25 are standard circuits well-known in the art and the construction thereof will not be elaborated upon herein.

The aim of the adaptive array processing apparatus of FIG. 1 is to compute adaptive auxiliary weights which when applied to corresponding auxiliary signals and combined with the main signal at each sample time will succeed in minimizing the undesired sidelobe interference by creating effective nulls in the direction of such interferences during reception. In the present invention, the optimal weights are derived for a given batch of data samples consisting of M samples of main and auxiliary signals, namely, $$\left\{ s_0(m) \right\}_{m=1}^{M} \text{ and } \left\{ \underline{s}(m) \right\}_{m=1}^{M},$$

where $s_0$ designates the complex baseband main signal and s represents the auxiliary complex baseband signal vector whose components are corresponding individual auxiliary signals. Note here that M is chosen to be large enough so that the adaptive weight vector w may be computed within an M-sample time and subsequently applied to the same set (batch) of data that it was derived from. The m-th sample of the combined output signal will then be $$s_C(m) = \underline{s}^T(m)\underline{w} + s_o(m)$$

$$= \sum_{n=1}^{N} s_n(m)w_n + s_o(m)$$

to do this, $$\left\{ s_o(m) \right\}_{m=1}^{M} \text{ and } \left\{ \underline{s}(m) \right\}_{m=1}^{M}$$

must be preserved in storage such as a delay line memory (shift-register) means 44 and 41 respectively.

In some radar applications when the clutter return constitutes a substantial part of the received main signal $s_o$, it is necessary to remove most of this background interference before it is possible to deal effectively with the minimization of sidelobe interference. The fundamental reason for doing this is the desire to minimize any influence of clutter in the determination of the adaptive weight vector, w. In this embodiment the signals $s_o$ and s are applied to clutter precancelling apparatus 26 following the A/D conversion. Clutter precancelling techniques, including 2-pulse cancelling, are well-known to those skilled in the art and will not be elaborated upon herein.

FIG. 1 shows that sampled main and auxiliary signals $s_o$ and s are presented to the clutter precancelling apparatus 26 while at the same time they are stored in the delayline memories 44 and 41 which can store, in sequence, a batch of M main and auxiliary complex signal samples. At the output of the clutter precanceller 26, clutter precancelled signals $s_o$ and s are produced having a substantially reduced amount of clutter, and proportionately more undesired interference than their original versions (at the input of the clutter precanceller 26). The clutter-precancelled signals $s_o$ and s are subsequently used to compute the NXN complex covariance matrix C, a Hermitian (conjugate symmetric) matrix, and a forcing vector or cross-correlation N-vector b in computation unit 30. For convenience the clutter precancelled signals $s_o$ and s will be designated simply by $s_o$ and s throughout the remainder of this description. These quantities, C and b, are defined by:

$$C = (\underline{s}, \underline{s}^T)$$

$$= \frac{1}{M} \sum_{m=1}^{M} \underline{s}^*(m)\underline{s}^T(m)$$

$$= \frac{1}{M} \sum_{m=1}^{M} \begin{bmatrix} s_1(m) \\ \vdots \\ s_N(m) \end{bmatrix}^* [s_1(m) \ldots s_n(m)]$$

$$= \frac{1}{M} \sum_{m-1}^{M} \begin{bmatrix} s_1(m)s_1^*(m) \ldots s_1(m)s_N^*(m) \\ \vdots \\ s_N(m)s_1^*(m) \ldots s_N(m)s_N^*(m) \end{bmatrix}$$

$$\underline{b} = (\underline{s}, s_o)$$

-continued $$= \frac{1}{M} \sum_{m=1}^{M} \underline{s}^*(m)s_o(m)$$

$$= \frac{1}{M} \sum_{m=1}^{M} \begin{bmatrix} s_1(m) \\ \vdots \\ s_N(m) \end{bmatrix}^* s_o(m)$$

Note that C is the covariance matrix of the auxiliary vector s computed as an average of outer product $s^*(m)s^T(m)$ over the M samples of a given batch. The cross-correlation vector b is the average of scalar-by-vector products $s^*(m)s_o(m)$ over the same M samples of the given data batch. Here * implies complex conjugacy.

The construction of the C and b computation unit 30 involves simply multiplications and accumulations which presents no difficulties to one skilled in the art of digital design. As such, the construction of this particular block will be assumed to be well within the expertise of those skilled in the art, except that the memory is described in some detail to aide in the understanding of signals supplied thereby.

Figure 2:
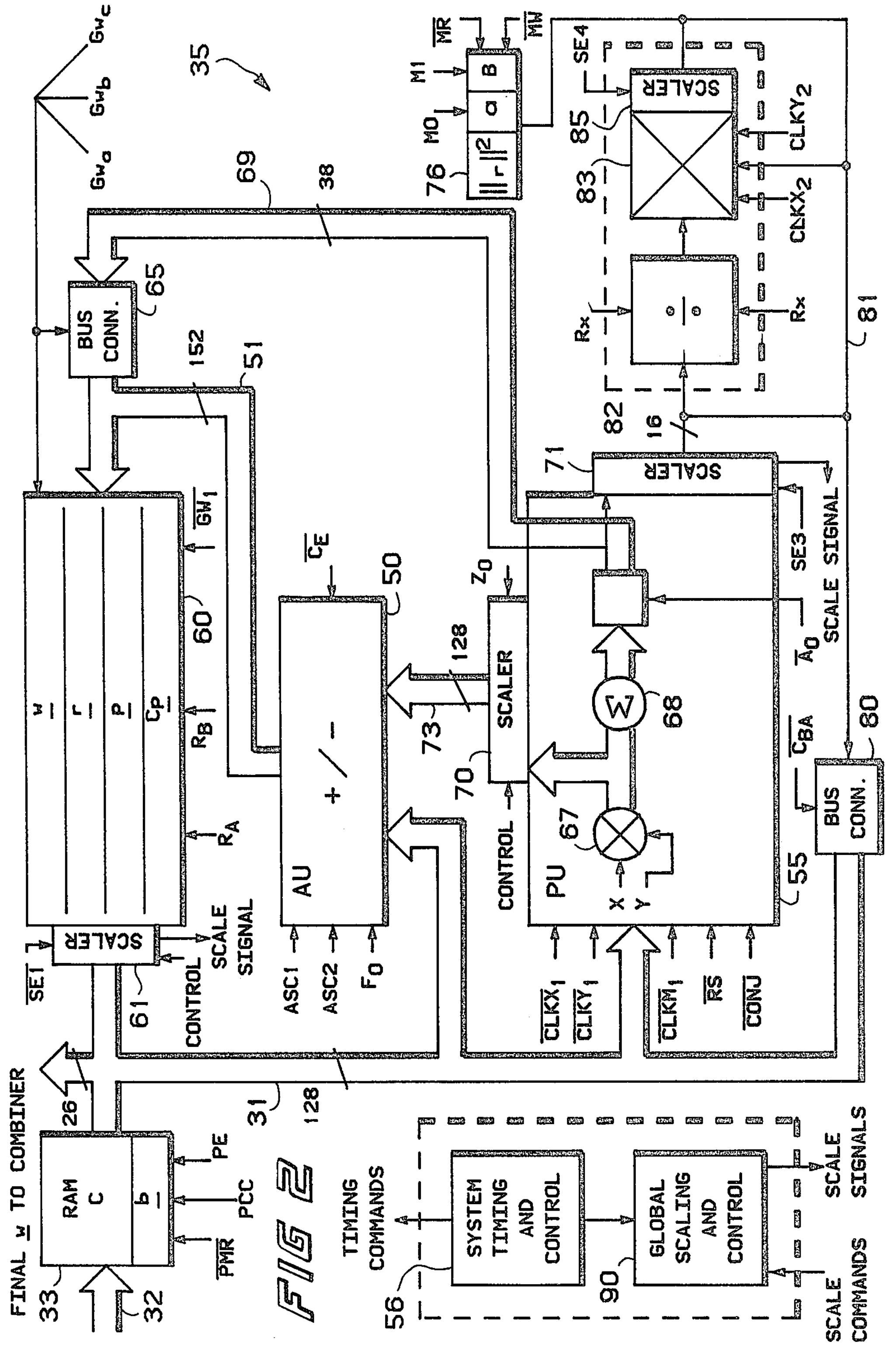
FIG. 2 is a detailed block diagram of a portion of FIG. 1.

In the present embodiment wherein N is equal to 4, the computation unit 30 of FIG. 1 supplies signals to a random access memory (RAM) 33 of FIG. 2 by way of a bus 32. The b vector arranged therein as a four word vector and the C matrix arranged therein in a 4×4 format. Each complex word involved is stored as a 32-bit 2's complement binary number, where the most significant set of sixteen bits represents the real part and the set of least significant bits represents the imaginary part. RAM 33 has a 128-bit storage capability per row, which allows for storage, in a single row, of the four complex words representative of b. The matrix C is stored in four additional rows with four complex words in each row. The data is accessed by row with a 128 wire data bus 31. The RAM storage means 33 is connected by means of the 128 wire data bus 31 to a batch covariance relaxation (BCR) processor 35. The RAM storage means 33 is an input storage means for the procesor 35 and supplies the correct signals on command for the proper operation of the processor 35.

The desired adaptive weight vector, w, which satisfies the complex system of linear equations $$Cw + b = 0$$

is derived by BCR processor 35. More specfically, C and b, having been latched into RAM storage unit 33, become available to the BCR processor 35 via a 2BN-lead bus (where B is the number of bits for each real or imaginary word involved) thus transferring b first and, subsequently, one row of C at a time. The weight-vector solution w is then produced at the output of the BCR processor 35 within a batch-time of M samples and is made available at the input to an auxilary signal combiner 40 at the precise time when the first sample of the auxiliary signal vector batch $$\underline{s}(m)_{m=1}^{M}$$

reaches the output of the auxiliary vector delay memory 41.

The auxiliary signal combiner 40 simply generates the sample-by-sample weighted sum $$\underline{s}^T(m)\underline{w} = \sum_{n=1}^{N} s_n(m)w_n$$

which is done within a small number of sample times depending on the speed of multiplication and addition operations as anyone skilled in the art could determine. Letting L be the number of sample times needed to process the weighted sum, the main signal samples $s_o$ (m) need to be delayed by L sample times so that they may be combined coherently with the auxiliary signal weighted sum at a final summing stage 43 where the combined signal samples $$s_C(m) = s^T(m)w + s_o(m)$$

are formed.

The description of the delayline memories 44 and 41 may now be made more precise. If the BCR processor 35 requires M sample times to produce the desired weighting vector w, and since it will be applied to a corresponding batch of auxiliary signals $$\left\{ \underline{s}(m) \right\}_{m=1}^{M},$$

C and b will need to have been computed from this same batch which will take a total of M sample times. The total computational delay from the input to the C and b computation unit 30 and the output of the BCR processor 35 is 2M sample times. Considering that the clutter precanceller 26 will also have a delay of K samples (K=1 for a two-pulse canceller), the auxiliary complex vector signal delay memory (41) length should consist of K+2M register stages. By the same token, the main signal delay memory (44) length should be K+2M+L.

Referring specifically to FIG. 2, the BCR processor 35 is illustrated in detail. The 128 wire data bus 31 carrying output information from the input RAM 33 is connected to one input of an arithmetic unit 50 and may be selectively connected to either an X or a Y input of a processing unit 55. A system timing and control block 56 provides timing commands to all of the various components illustrated in FIG. 2 and ensures the correct sequence of operations thereof, as will be described presently. The 128 wire bus 31 connected to the X and Y inputs of the processing unit 55 is actually connected to both inputs simultaneously and the timing signals from the block 56 determine the input, X or Y, to which the signal is applied. Similarly, the timing signals from the block 56 determine the application of the signals b and C from RAM 33 to the 128 wire bus 31.

In this embodiment, the number of bits per real or imaginary word of each signal sample is typically 10 (although it could be different, depending on A/D availability). At the output of the clutter precanceller 26, the required resolution will be 11 bits to avert any overflow in the case of a two-pulse canceller. Depending on the structure of the clutter precanceller 26 the number of bits per word may exceed 11. In the present invention, however, since the input resolution is only 10 bits, the clutter-precanceller signals may be represented with 12-bit words. Subsequently, at the C and b computation unit 30, the words comprising C and b may grow to be as large as 22 $+\log_2 M$ when a two-pulse clutter precanceller is assumed. If suffices to represent C and b via a 16-bit word resolution, assuming appropriate upscaling has taken place such that the largest word in each quantity (C and b) is left-justified. This is done by shifting C a number of bits KC such that the largest words of C (real or imagninary) is fully left-justified. After this so-called local shifting of DC bits of all words in C, only the top 16 most significant bits are preserved. A similar local shift on b of KB bits followed by an appropriate truncation results in a 16-bit left-justified representation of b. As a consequence, the solution of $$Cw + b = 0$$

using these left-justified quantities will result in a weight vector w that is shifted up by KB-KC over its correct value. Consequently, this effect of prescaling must be corrected by postscaling after w is produced by the BCR processor 35.

The 16-bit left-justified representations of C and b are transferred from the C and b RAM 33 via a bus 31 one N-vector at a time. Specifically, when N=4, bus 31 is composed of 128 wires over which b is transferred first, followed by each row of C, as needed by the BCR processor.

Vector storage means 60 is connected through an adaptive scaling circuit 61 to the 128 wire bus 31. The vector storage means 60 is capable of storing four column vectors containing 160 bits each. The signals representative of the four column vectors are the complex weight vector, w, a complex residual vector, r, a relaxation (search) vector, p, and Cp, which is the complex N-vector that results from the multiplication of the matrix C and the vector p. The storage means 60 may be, for example, a random access memory (RAM) and in the present embodiment the required memory is implemented with forty 74LS670 IC's. Each IC stores four 4-bit words. Because of this particular IC configuration, it is convenient to allow twenty bits for each real or imaginary word comprising the components of the four complex vectors involved. From numerical considerations, each real or imaginary component of Cp requires nineteen bits of storage, for the present case where N=4. The particular signal being read out of the storage means 60 or written into the storage means 60 is controlled by the timing signals from the block 56. Input signals for the storage means 60 are received from the arithmetic unit 50 on a 152 wire bus 51, which is also connected to a bus-connect circuit 65. The input of the bus connect 65 is a 38 wire bus 69 and the bus connect circuit 65 serves to fan out the 38 bit signals received therein onto appropriate locations of the 152 wire bus 51 connected to the input of the vector storage means 60. Real or imaginary components of updated vectors w, r, and Cp at the output 51 of the arithmetic unit 50 may be accommodated with seventeen bits. Extended by two more bits, the updated vectors are presented to the vector RAM 60 via the same 152 wire bus that carries Cp.

The processing unit 55 contains circuitry which performs complex vector dot products, as well as matrix-vector products and scalar-vector products. The processing unit 55 includes multiplying circuitry 67 and summing circuitry 68. In the case of scalar-vector products involving a real scalar, the output may be taken directly from the multiplying circuitry 67. This output is supplied through a second adaptive scaling circuit 70 to a 128 wire bus 73 which is connected to a second input of the arithmetic unit 50. When performing complex vector dot products or matrix-vector products, the output signals are taken from the output of the summing circuitry 68. The 38 wire bus connected to the bus connect circuit 65 is connected to the output of the summing circuitry 68 to convey the N-vector Cp to the vector storage means 60 one complex component at a time. Other complex vector dot products resulting in positive real scalars are connected through a 16 wire bus 72 to either of two inputs to division means, generally designated 75, and to an input of scalar storage means 76. An output of the division means 75 is also connected to the scalar storage means 76 and the output of the division means 75 as well as the output of the scalar storage means 76 are connected by way of a 16 wire bus 81 to a bus connect circuit 80 which connects to the 128 wire bus 31. The bus connect circuit 80 operates on scalar signals applied thereto to fan out the signals in parallel to all 4 real-word locations of bus 31. The output of the scalar storage means 76 is also connected to the inputs of the division means 75.

The processing unit 55 may be constructed in a variety of embodiments to perform the described complex vector dot products and may be, for example, constructed in accordance with the teachings of a copending U.S. patent application entitled "Processing Unit", Ser. No. 06/132,963, filing date Mar. 24, 1980, and assigned to the same assignee. The division means 75 may be any circuitry which will perform the required functions and may be, for example, a unique high speed circuit including a division look-up table 82 and a real multiplier 83 connected so that one input of the division means 75 is applied to an input of the division look-up table 82 and the other input is connected to one input of the real multiplier 83 with the output of the look-up table connected to a second input to the real multiplier 83. The output of the real multiplier 83 is connected through an adaptive scaling circuit 85 and serves as the output of the division means 75. A complete operation and description of the unique division means is taught and disclosed in a copending application entitled "Digital Divider", filed Nov. 19, 1979, Ser. No. 06/095,823 and assigned to the same assignee. The input applied to the division look-up table 82 will be the divisor while the input applied to the real multiplier 83 will be the dividend.

The adaptive scaling circuits 61, 71 and 85 are circuits designed to sense the position of the most significant bit in each digital word and apply a local shift as needed to left justify the maximum magnitude word comprising the vector or scalar quantity involved. Also, scaling circuits 61 and 70 may receive bit-shift commands from a global scaling and control block 90 in order to equalize the respective scales of quantities to be combined at the arithmetic unit 50. In the present embodiment the adaptive scaling takes the place of an AGC function throughout the computations thus guaranteeing maximum numerical resolution. Essentially, the scaling circuits 61, 71 and 85 attempt to shift words supplied therethrough so that optimun use of the number of bits in the word may be made. Scaling circuit 70 need not have such a local scale capability since left justification at the PU 55 gives rise to left-justified output quantities into network 70 within 1 bit. Each time a shift occurs, a scale signal is supplied to the global scaling and control block 90 accumulating there with previous shifts into a global scale associated with the particular quantity involved. When operations such as addition or subtraction via arithmetic unit 50 are performed, the global scaling and control block 90 supplies control signals to specific adaptive scaling circuits 61 and 70 to shift word supplied thereto so that the global scale signals coincide and the words can be added or subtracted appropriately. The adaptive scaling circuits 61, 70, 71 and 85 may be constructed in accordance with the teachings of copending U.S. patent application entitled "Digital Scaling Apparatus", Ser. No. 06/134,859, filing date Mar. 28, 1980, and assigned to the same assignee. The global scaling and control block 90 along with the control of the adaptive scaling circuits 61, 70, 71 and 85 may be constructed in accordance with copending U.S. patent application Ser. No. 159,036entitled "Adaptive Fixed Point Arithmetic Controller", assigned to the same assignee, filed of even date herewith and now U.S. Pat. No. 4,334,283 issued 6/8/82.

The operation of the apparatus illustrated in FIG. 2 is generally as follows. The BCR process is an iterative procedure which uses the quantities C and b to solve the special system of N complex equations, Cw+b=0for the weighting vector w, in at most N steps. The apparatus is initialized, or prepared for the operation, by assuming an initial value of $w^o$. Subsequent iterations produce improved estimates $w^1, w^2, \ldots, w^r$ where $w^r$is the r-th estimate and happens to be a sufficiently good estimate of the desired solution to Cw+b=0. Here r=rank C≦N; that is, the final result is obtained in, at most, N iterations (4in the present configuration). More specifically, this is the case when $w^o=0$. Specialized to this initial estimate, the actual process carried out by the BCR processor is as follows.

The initialization of the BCR processor consists of defining the initial residual and search vectors $$r^o = Cw^o + b$$

$$p^o = r^o$$

respectively, where in the present case $r^o=b$, since $w^o$ was chosen to be 0. The initial value of w, r and p are loaded into the vector storage means 60. First, r and p, which are initially equal to b, are loaded by fetching b from the RAM 33 onto bus 31 and presenting them to the arithmetic unit 50 while simultaneously setting bus 73 to zero. Upon performing the addition at the AU 50 b appears at the bus 51 output and is loaded into the r location of the vector storage 60. Upon repeating this process, b is loaded in at the p location of the vector storage means 60. A "clear" command at the arithmetic unit 50 clears the bus 51 output allowing the loading of 0 into the w location of the vector storage means 60.

The initialization part of the BCR processor 35 is completed by computing the initial value of $\|r^o\|^2$, $\|b\|^2$, by first latching b into the X-port of the PU 55 and simultaneously presenting it to the Y-port. The end result is $$r^{o2} = \|b\|^2 = \sum_{n=1}^{N} |b_n|^2$$

where $b_n$ stands for the magnitude of the n-th complex component of vector b. This real quantity appears as a 19-bit number at the input of the scaling network 71 which subsequently extracts a left-justified 16-bit version that is finally transmitted to the scalar storage means 76 where it is stored in the $||r||^2$ location. Note that the scaling network 71 has a shift range (0,15) in the present embodiment. Further, the processing unit 55 includes switching means for conjugating one of the inputs so that the dot product of the complex vectors r and the conjugate of r is equal to the squared magnitude of r, $||r||^2$, the real scalar value that is applied by way of the scaling circuit 71 and bus 72 to the $||r||^2$ location in the scalar storage means 76. The BCR processor illustrated in FIG. 2 is now completely initialized and the steps described above are not repeated during the iterative portion.

The main part of the process carried out by the BCR processor 35 consists of an iterative updating procedure which evolves BCR vector variables w, r, and p by means of incremental changes according to relations $$w^{k+1}=w^k-\alpha_k p^k$$

$$r^{k+1}=r^k-\alpha_k Cp^k$$

$$p^{k+1}=r^{k+1}+\beta_k p^k$$

for $k=0, 1, \ldots, r\leqq N$, where $r=\text{rank } C$, $$\alpha_k=\frac{||r^k||^2}{(p^k, Cp^k)}$$

$$\beta_k=\frac{||r^{k+1}||^2}{||r^k||^2}$$

$$(p, Cp)=Re\sum_{n=1}^{N}p_n(Cp)^*{}_n$$

Here, $\alpha_k$ is called the relaxation coefficient and Cp is the complex N-vector that results from the multiplication of the $N\times N$ matrix C by the N-vector p.

It suffices to explain the steps within one iteration of the BCR process following the initialization as described. The first computation performed is that of Cp. This is done by performing the needed N dot products involving consecutive rows of C and vector p by means of the PU 55. To accomplish this, p is loaded into the X input of the processing unit 55 from the vector storage means 60 by way of scaling circuit 61 and bus 31. It should be noted that during the first iteration, r equals p and r is also available at the X input from the initialization procedure. Now, the matrix C is loaded into the Y input of the processing unit from the input RAM 33 by way of the bus 31. To accomplish this, the matrix C is loaded into the Y input one row at a time and the componentwise results are supplied to the Cp portion of the vector storage means 60 by way of bus 69, bus connect circuit 65 and bus 51. This process continues until the total computation, or resultant 19 bit vector Cp is loaded componentwise into the vector storage means 60 in the designated Cp location.

When the Cp vector loaded into the vector storage means 60, one of the inputs X or Y of the processing unit 55 is switched so that the input is conjugated. A 16-bit left-justified version of the vector Cp is loaded into one of the X and Y inputs from the vector storage means 60 by way of scaling circuit 61 and bus 31. The vector p is still available at the other one of the X or Y inputs. A 19 bit scalar representative of the dot product (p, Cp), or $p^{*T}Cp$, is computed and presented to the scaling network 71 which produces a left-justified 16-bit version. The 16-bit left-justified real word is then presented to the look-up table 82, which, in turn, produces a 16-bit fully-justified version of its reciprocal to on input of the multiplier 83. During this process the signal $||r||^2$ is taken from the scalar storage means 76 and applied to the other input of the real multiplier 83. It should be noted that this value can be loaded into the real multiplier 83 after its initial calculation and during the time that it is being loaded into the scalar storage means 76. The output signal, $\alpha$, representative of the resulting real scalar is subsequently left-justified in the scaling circuit 85 and applied to the appropriate location of the scalar storage means 76. The signal $\alpha$ is also supplied by way of bus 81, bus connect circuit 80 and bus 31 to one of the inputs, X or Y, of the processing unit 55. The signal p is already available at the other one of the X or Y inputs and, with the switch operated so that conjugation does not occur, individual component multiplication of the two inputs are produced and the scalar-vector product $\alpha p$ becomes available at the output of the multiplying circuits 67. The product $\alpha p$, involving no summing in the circuits 68, is supplied through the scaling circuit 70 and bus 73 to one input of the arithmetic unit 50. Simultaneously, the current w signal, $w^k$, is loaded into the other input of the arithmetic unit 50 from the vector storage means 60 by way of the scaling circuit 61 and bus 31 resulting in the updated value $w^{k+1}=w^k-\alpha p^k$. The global scaling and control unit 90 keeps a complete account of bit shifts throughout the above procedure. The resultant updated weighting vector $w^{k+1}$ consists of two 17-bit words per component (real and imaginary parts) and is converted to two 19-bit words per component by attaching trailing zeros. Note that in order to perform this scale equalization function, scaling circuit 61 has bidirectional shifting capability while the scaling circuit 70 is capable of downshifts only. In the specific embodiment of FIG. 2, scaling circuit 61 has a shifting range of −7 to 8 and the scaling circuit 70 has a shifting range of −15 to 0. This updated w signal, $w^{k+1}$, is supplied to the proper location of the vector storage means 60 by way of the bus 51.

With the signal $\alpha$ still available at the X or Y inputs of the processing unit 55, the vector Cp is loaded into the other of the X or Y inputs from the vector storage means 60. The scalar-vector product of $\alpha Cp$ is applied to the arithmetic unit 50 by way of the scaling circuit 70 and bus 73. The current r signal, $r^k$, representative of the complex residual vector is loaded into the other input of the arithmetic unit 50 from the vector storage means 60 and the two signals are added or combined to give the updated r signal, $r^{k+1}$. Thus, $r^{k+1}=r^k+\alpha Cp$. The updated r signal, $r^{k+1}$, is supplied to the appropriate location of the vector storage means 60 by way of bus 51.

Subsequently, the updated r signal, $r^{k+1}$, is applied to the X and Y inputs of the processing unit 55 from the vector storage means 60 and one of the inputs is switched to provide conjugation. The processing unit 55 performs the dot product to produce the real scalar signal $\mu r^{k+1}||^2$ which is subsequently supplied to the input of the real multiplier 83 by way of the scaling circuit 71 and bus 72. Simultaneously, the $||r^k||^2$ is brought from the scalar storage means 76 to the input of the look-up table 82 and the updated value $||r^{k+1}||^2$ is written into the appropriate location of the scalar storage means 76. The look-up table 82 provides an output signal, the reciprocal $1/||r^k||^2$, to the second input of the real multiplier 83. The output signal of the multiplier 83 is the signal $\beta_k$ which is left-justified in the scaling circuit 85 and applied to the appropriate storage location of the scalar storage means 76.

In addition to being applied to the scalar storage means 76, the signal $\beta_k$ is supplied by way of bus 81, bus connector circuit 80 and bus 31 to one of the inputs X or Y of the processing unit 55. The p signal is applied to the other input of the processing unit from the vector storage means 60 and the scalar-vector product, $\beta_k p^k$ is supplied through the scaling circuit 70 and bus 73 to the arithmetic unit 50. The current residual vector $r^k$ is available at the other input of the arithmetic unit 50 (from the previous computation) and the product $\beta p^k$ is added to the vector $r^k$ to provide an updated relaxation vector $p^{k+1}$. This updated relaxation vector is supplied to the correct location of the vector storage means 60, by way of bus 51. Thus, the complex weight vector w, the complex residual vector r, and the complex relaxation vector p are updated and the processor is prepared for a second iteration.

This procedure is repeated until $\|r\|^2$ attains a sufficiently small value. Since r=Cw+b, this says that Cw+b is nearly zero in the mean-square sense and the solution w obtained satisfies Cw+b=0 within the numerical resolution of the BCR processor; namely, 16 bits in the present case. For this reason a reduction of $\|r\|^2$ by $2^{15}$ from its initial value is considered a reasonable stopping condition. This so-called convergence condition will occur at the end of r iterations, where r=rank C≦N. Since this implies a finite processing time, the BCR processor is suited for a batch process, as its name implies.

In the above described procedure, if k+1 equals N or the signal $\|r^{k+1}\|^2$ is less than a pre-assigned small number, the process is terminated. If neither of these values has been reached the k+1 (symbol for an updated value) is replaced by k (symbol for the current value) and another iteration is started by returning to the step immediately following the initialization steps; i.e., the computation Cp. Once the final iteration is performed, in accordance with the above described tests, the final signal w, representative of the complex weight vector, is supplied to the combining circuit 40 (FIG. 1). The final estimate of the weight vector w, the desired solution, is accessed as a 16 bit left-justified vector quantity via scaling circuit 61 or may be truncated to 12 or 8-bit representations before it is sent to the combining circuit 40. The choice made is a tradeoff between accuracy and complexity at the combining circuit 40.

It should be noted that in an alternate embodiment $\alpha$ and $\beta$ may be derived as follows:

$$\alpha_k = \frac{(\underline{p}^k, \underline{r}^k)}{(\underline{p}^k, C\underline{p}^k)}$$

$$\beta_k = -\frac{(\underline{r}^{k+1}, C\underline{p}^k)}{(\underline{p}^k, C\underline{p}^k)}$$

The actual operation of the described circuitry will be apparent to those skilled in the art, from the above equations. Of course the timing diagram of FIG. 3 will not apply to this alternate embodiment since different expressions are being computed.

From the practical point of view, the BCR processor is designed to interrupt automatically in case of overflow and dynamic range violations. In particular, the positive real 16-bit scalar input to the division lookup table is monitored for full justification. If an input fails to possess of 01 pattern in its most-significant end, it will automatically detect it and affect a system interrupt. It should be mentioned that the weight vector in RAM 60 is still a valid estimate of the desired solution and could be used in case of a system interrupt. Similarly, a dynamic range system-interrupt will be detected when scale equalization cannot be achieved at the input to the AU (50) in performing a BCR vector update. In each case the BCR system is fully protected numerically, and thus constitutes an autonomous computationally robust system.

Figure 3A:
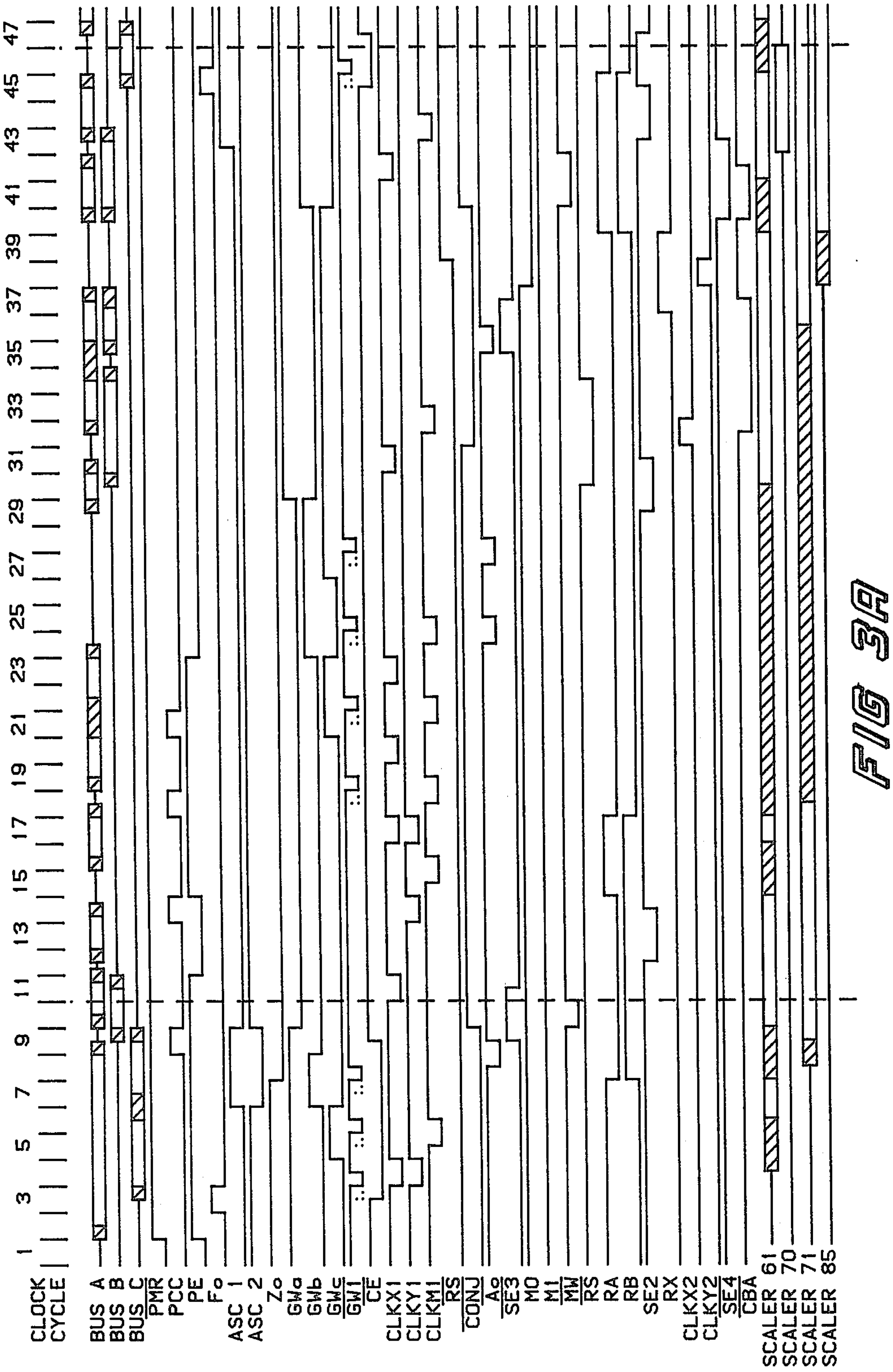
FIG. 3A and 3B gives the timing diagram for the apparatus of FIG. 2.
Figure 3B:
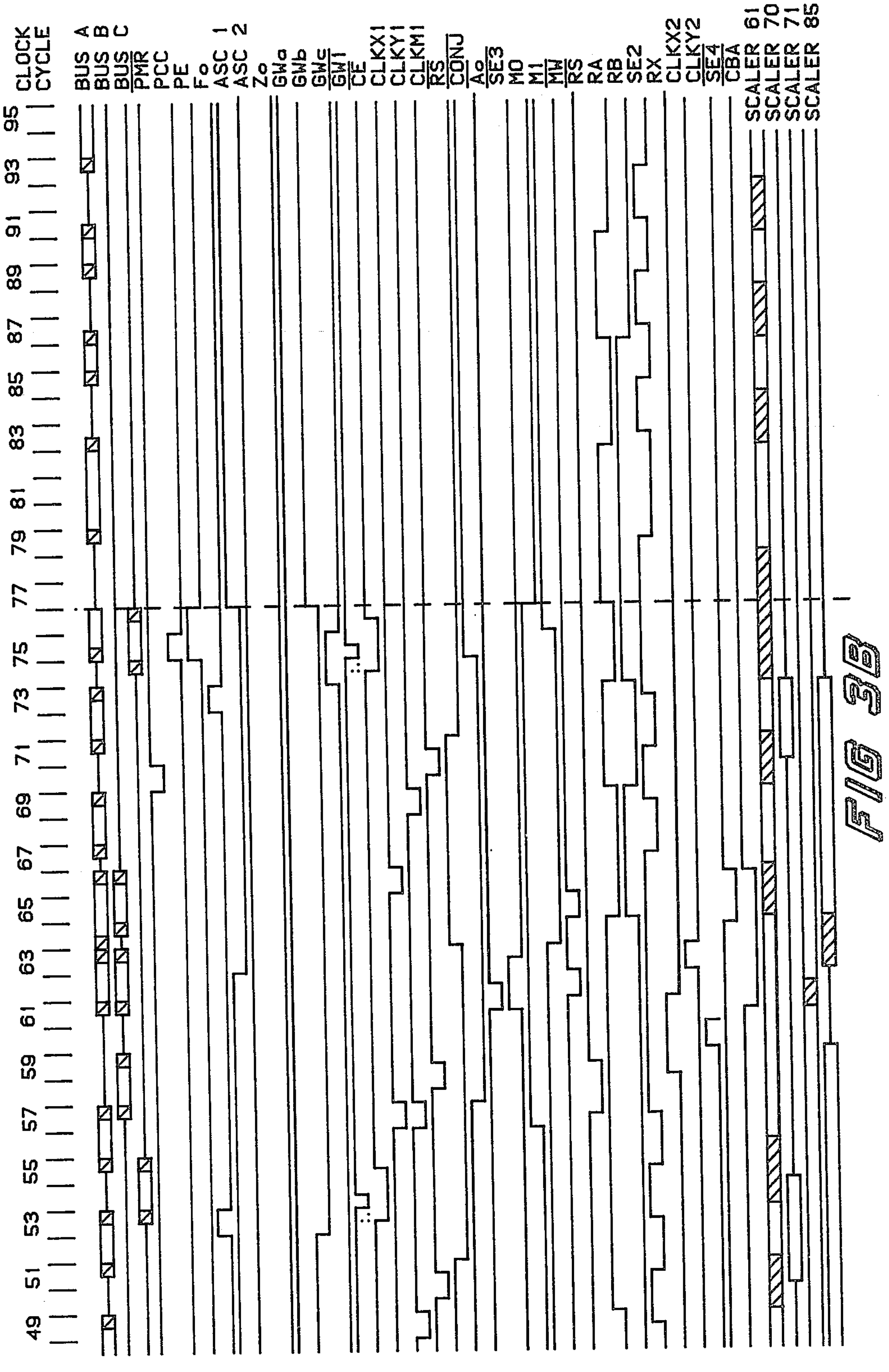

FIG. 3 illustrates a typical timing sequence for the apparatus of FIG. 2 and the above described procedure. Inputs for the various timing signals are shown in FIG. 2 and a description of each timing signal is listed in the following chart. Any further description of the timing and control block 56 would unduly complicate the present description and is not necessary to a complete understanding of the invention. Furthermore, it should be noted that the timing diagram of FIG. 2 is not unique and variations thereof could be obtained by one skilled in the art and aware of the overall system description already given.

| SIGNAL | DESCRIPTION |
|---|---|
| | Input Control |
| $\overline{PMR}$ | Input Counter Master Reset |
| PCC | Input Counter Clock |
| PE | Input Bus A Enable Command |
| | AAU Control |
| $F_O$ | Bus A Input Storage Clock |
| ASC1 | Add/Subtract/Clear Command (LSB) |
| ASC2 | Add/Subtract/Clear Command (MSB) |
| | Column Vector Storage Control |
| $GW_a$ | Memory Write Address (LSB) |
| $GW_b$ | Memory Write Address |
| $GW_c$ | Memory Write Address (MSB) |
| $\overline{GW1}$ | Memory Write Command |
| $\overline{SE1}$ | Scalar 1 to Bus A Enable Command |
| $R_A$ | Memory Read Address (LSB) |
| $R_B$ | Memory Read Address (MSB) |
| | CPU Control |
| $\overline{CLKX_1}$ | Complex Multiplier X-Input Clock |
| $\overline{CLKY_1}$ | Complex Multiplier Y-input Clock |
| $\overline{CLKY_1}$ | Complex Multiplier Output Clock |
| $\overline{RS}$ | Multiply Overflow Protect Command |
| $\overline{A_O}$ | Real (p, Cp) Temporary Storage Clock |
| $\overline{CONJ}$ | Conjugate Multiplication Control at Summer |
| SE3 | Scalar 3 Output to Bus B Enable Command |
| $\overline{Z_O}$ | Zero Input at CPU Port |
| | Real Scalar Control |
| $R_X$ | Division Table Read Command |
| $CLKX_2$ | Real Multiplier X Input Clock |
| $CLKY_2$ | Real Multiplier Y Input Clock |
| $\overline{SE4}$ | Scalar 4 Output to Bus B Enable Command |
| $\overline{C_{BA}}$ | Bus B to Bus A Connect Enable Command |
| M0 | Real Memory Address (LSB) |
| M1 | Real Memory Address (MSB) |
| $\overline{MW}$ | Real Memory Write Command |
| $\overline{MR}$ | Real Memory Read Command |

Because of the unique configuration of the BCR processor, it is extremely fast and relatively simple to construct. The iterative nature of the BCR process is uniquely exploited in the bus oriented pipeline functional apparatus illustrated. While the complexity of other systems, such as a sample matrix inversion system, for finding the complex weight vector w increases according to $N^2$, the complexity of the present system using a BCR processor increases proportionately with N. Note that to achieve the faster response-time (batch time) of an SMI processor, it takes approximately 4 BCR processors whose combined complexity is less than that of a particular configuration of the SMI processor. Further, while a plurality of BCR processors increase the response time performance, each processor is capable of operating by itself and, therefore, provides an inherent redundancy. For instance, in case of malfunction of a subset of the available set of multiplexed BCR processors, the system has the fail-safe option of utilizing the remaining operable hardware, suffering only a graceful degradation in overall response-time performance. Many other connections of multiple BCR processors may be devised by those skilled in the art in order to achieve other advantages. Further, while the above description is drawn to a parallel embodiment, it will be apparent that a serial embodiment involving a single complex multiplier in the processing unit 55 could be utilized and such an embodiment is within the teachings of this disclosure. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In the general statement $Cw+b=0$ for a system of N complex equations, where C is an $N \times N$ complex Hermitian covariance matrix of a first set of N signals and b is a complex forcing N-vector produced by the cross-correlation between the first set of N signals and a second signal, apparatus providing a signal representative of a near optimum value of the complex weight vector w comprising:

(a) input storage means for storing signals representative of C and b therein;

(b) vector storage means including separate storage areas for signals representative of the complex weight vector w, a complex residual vector r, a complex relaxation vector p, and the matrix-vector product Cp and output means for selectively supplying any one of these signals upon command;

(c) arithmetic means having two inputs and an output for selectively adding and subtracting signals on the two inputs upon command and supplying a signal representative of the addition or subtraction at the output;

(d) a central processing unit having multiplying means for multiplying vectors and scalars, said multiplying means having two inputs and means for conjugating signals applied to one of the inputs, said central processing unit further having summing means with an input connected to an output of said multiplying means;

(e) division means having a divisor input, a dividend input and an output;

(f) scalar storage means including output means for selectively supplying any one of the stored signals upon command; and (g) means including timing controls for selectively coupling the signals representative of C and b to one input of said arithmetic means and to either input of said multiplying means, for coupling the output means of said vector storage means to the one input of said arithmetic means and to the inputs of said multiplying means, for coupling the output of said arithmetic means to the vector storage means, for coupling an output of said multiplying means to the second input of said arithmetic means, for selectively coupling an output of said summing means to said vector storage means, the divisor and dividend inputs of said division means and the scalar storage means and for selectively coupling the output means of said scalar storage means to the divisor and dividend inputs of said division means, either of the two inputs of said multiplying means and the one input of said arithmetic means in a proper sequence to provide an output signal representative of a near optimum value of w.

2. In the general statement $Cw+b=0$ for a system of N complex equations, where C is an $N \times N$ complex Hermitian covariance matrix of a first set of N signals and b is a complex forcing N-vector produced by the cross-correlation between the first set of N signals and a second signal, apparatus providing a signal representative of a near optimum value of the complex weight vector w comprising:

(a) input storage means for storing signals representative of C and b therein;

(b) vector storage means including separate storage areas for signals representative of the complex weight vector w, a complex residual vector r, a complex relaxation vector p, and the matrix-vector product Cp and output means for selectively supplying any one of the signals upon command;

(c) arithmetic means having two inputs and an output for selectively adding and subtracting signals on the two inputs upon command and supplying a signal representative of the addition or subtraction at the output;

(d) a central processing unit having multiplying means for multiplying vectors and scalars, said multiplying means having two inputs and means for conjugating signals applied to one of the inputs, said central processing unit further having summing means with an input connected to an output of said multiplying means;

(e) division means having a divisor input, a dividend input and an output;

(f) scalar storage means including separate storage areas for signals representative of $\|r^k\|^2$, $\alpha_k$ and $\beta_k$, at iteration k, where $$\alpha_k = \frac{\|r^k\|^2}{(p^k, Cp^k)}, \quad \beta_k = \frac{\|r^{k+1}\|^2}{\|r^k\|^2}$$

and output means for selectively supplying any one of the signals upon command; and (g) means including timing controls for selectively coupling the signals representative of C and b to one input of said arithmetic means and to either input of said multiplying means, for coupling the output means of said vector storage means to the one input of said arithmetic means and to the inputs of said multiplying means, for coupling the output off said arithmetic means to the vector storage means, for coupling an output of said multiplying means to the second input of said arithmetic means, for selectively coupling an output of said summing means to said vector storage means, the divisor and dividend inputs of said division means and the scalar storage means and for selectively coupling the output means of said scalar storage means to the divisor and dividend inputs of said division means, either of the two inputs of said multiplying means and the one input of said arithmetic means in a proper sequence to provide an output signal representative of a near optimum value of w.

3. Apparatus as claimed in claim 2 wherein the coupling means includes adaptive scaling circuitry.

4. Apparatus as claimed in claim 3 wherein the adaptive scaling circuitry is connected to provide scaling of output signals from the vector storage means, the processing unit and the division means.

5. Apparatus as claimed in claim 2 wherein the multiplying means of the central processing unit includes a plurality of multipliers and a plurality of summing devices with each summing device connected to combine output signals from a pair of multipliers, and the means for conjugating signals including switching means for reversing the polarity of imaginary components prior to combining.

6. Apparatus as claimed in claim 2 including, in addition, a plurality, N, of auxiliary antennas providing the first set of N signals and a directional main antenna providing the second signal and means coupling batches of the first set of signals and the second signal to the input storage means to form signals C and b.

7. Apparatus as claimed in claim 6 including means for combining the near optimum value of the complex weight vector with the total batch of the first set of signals to provide an output signal, which is the dot product of the weight vector and the total batch and further means for combining the output signal with the signal from the main antenna to substantially eliminate unwanted signals from the main antenna signal.

8. An adaptive antenna array system comprising:

(a) a directional main antenna;

(b) N omnidirectional auxiliary antennas;

(c) storage means connected to said main and auxiliary antennas for receiving a batch, M, of signals from each of said antennas and for providing an N×N complex Hermitian matrix and a complex N-vector;

(d) a Batch Covariance Relaxation processor connected to said storage means for receiving the matrix and the N-vector and providing a complex weighting vector;

(e) multiplying means coupled to said processor and said auxiliary antennas for multiplying the weighting vector with the signals from each of said auxiliary antennas to obtain weighted antenna signals; and (f) combining means coupled to said multiplying means and said main antenna for combining the weighted antenna signals with signals from the main antenna to substantially remove unwanted signals.

9. Apparatus for providing a real time solution to quadratic optimization problems that arise in linear or linearized nonlinear estimation, including a memory for forming an associated N×N complex Hermitian matrix and a complex N-vector, a Batch Covariance Relaxation processor connected to receive the N×N matrix and N-vector and provide a complex weighting vector, and means for forming a weighted sum of multisensor data in order to suppress undesired signals and enhance system performance.

10. An iterative process for providing electrical signals, w, representative of the complex weight vector in a system of N complex equations, $C\,w+b=0$, where electrical signals C represent an N×N complex Hermitian covariance matrix and electrical signals b represent a complex forcing N-vector, comprising the steps of:

(a) providing electrical signals $p^k$ and $r^k$ respresentative of a complex relaxation vector and a complex residual vector, respectively, and adjusting the electrical signals $p^k$ and $r^k$;

(b) electrically combining the signals $r^k$ and electrical signals $r^{k*}$, representative of the conjugate of the residual vector, to obtain electrical signals $\|r^k\|^2$ representative of the dot product;

(c) electrically combining the signals C and $p^k$ to obtain electrical signals $Cp^k$, representative of the a matrix-vector product;

(d) electrically combining one of signals $p^k\,Cp^k$ with one of electrical signals $(Cp^k)^*\,p^{k*}$, representative of the conjugate of the product of the covariance matrix and the relaxation vector and the conjugate of the relaxation vector, respectively, to obtain electrical signal $(p^k, Cp^k)$ representative of their dot product;

(e) electrically combining the electrical signals $\|r^k\|^2$ and $(p^k, Cp^k)$ to obtain electrical signal $\alpha_k$ representative of the quotient of the dot product represented by the signals $\|r^k\|^2$ divided by the dot product represented by the signals $(p^k, Cp^k)$;

(f) providing electrical signals $w^k$ representative of an initial estimate of the complex weight vector;

(g) electrically combining the signals $\alpha$, $p^k$ and $w^k$ to obtain electrical signals $w^{k+1}$ representative of the sum of the estimate of the current complex weight vector represented by the signals $w^k$ and the negative product of the quotient represented by the signals $\alpha_k$ with the relaxation vector represented by the signals $p^k$;

(h) electrically combining the signals $r^k$, $\alpha_k$ and $Cp^k$ to obtain electrical signals $r^{k+1}$ representative of the sum of the residual vector represented by the signals $r^k$ and the negative product of the quotient represented by the signals $\alpha_k$ with the dot product represented by the signals $Cp^k$;

(i) electrically combining the signals $r^{k+1}$ and electrical signals $r^{k+1*}$, representative of the conjugate of the updated residual vector, to obtain electrical signals $\|r^{k+1}\|^2$ representative of the dot product;

(j) electrically combining the signals $\|r^{k+1}\|^2$ and $\|r^k\|^2$ to obtain electrical signals $\beta_k$ representative of the quotient of the dot product represented by the signals $\|r^{k+1}\|^2$ divided by the dot product represented by the signals $\|r^k\|^2$;

(k) electrically combining the signals $r^k$, $\beta_k$ and $p^k$ to obtain electrical signals $p^{k+1}$ representative of the sum of the current residual vector represented by the signals $r^k$ and the product of the quotient represented by the signals $\beta_k$ with the relaxation vector represented by the signals $p^k$; and (l) substituting the signals $w^{k+1}$, $r^{k+1}$, $p^{k+1}$ and $\|r^{k+1}\|^2$ for the signals $w^k$, $r^k$, $p^k$ and $\|r^k\|^2$ in the above steps (c) through (k) and repeating the steps (c) through (k).

11. An iterative process as claimed in claim 10 including repeating the steps (c) through (j) until the occurrence of one of the updated dot product rrepresented by the electrical signal $\|r^{k+1}\|^2$ reaches a predetermined small value or the number of times the steps (c) through (k) are repeated equals at most N.

12. In conjunction with an adaptive antenna array including a directional main antenna and a plurality, N, of generally omnidirectional auxiliary antennas a method of suppressing sidelobe interference comprising the steps of:

(a) forming an N×N complex Hermitian batch covariance matrix, C, from signals s received at the auxiliary antennas the covariance matrix being represented by electrical signals C;

(b) forming a complex forcing N-vector from the cross correlation of signals s received on each of the auxiliary antennas with signals $s_o$ received on the main antenna, the forcing vector being represented by electrical signals b;

(c) providing electrical signals $p^k$ and $r^k$ representative of a complex relaxation vector and a complex residual vector, respectively, and adjusting the electrical signals $p^k$ and $r^k$;

(d) electrically combining the signals $r^k$ and electrical signals $r^{k*}$, representative of the conjugate of the residual vector, to obtain electrical signals $r^k$ 2 representative of a dot product;

(e) electrically combining the signals C and $p^k$ to obtain electrical signals $Cp^k$, represenative of a matrix-vector product;

(f) electrically combining one of signals $p^k$ or $Cp^k$ with one of electrical signals $(Cp^k)^*$ or $p^{k*}$, representative of the conjugate product of the covariance matrix and the relaxation vector and the conjugate of the relaxation vector, respectively, to obtain electrical signals $(p^k, Cp^k)$ representative of a dot product;

(g) electrically combining the electrical signals $\|r^k\|^2$ and $(p^k, Cp^k)$ to obtain electrical signal $\alpha_k$ representative of the quotient of the dot product represented by the signals $\|r^k\|^2$ divided by the dot product represented by the signals $(p^k, Cp^k)$;

(h) providing electrical signals $w^k$ representative of an initialestimate of the complex weight vector;

(i) electrically combining the signals $\alpha_k$, $p^k$ and $w^k$ to obtainelectrical signals $w^{k+1}$ representative of the sum of the estimate of the complex weight vector represented by the signals $w^k$ and the negative product of the quotient represented by the signals $\alpha_k$ with the relaxation vector represented by the signals $p^k$;

(j) electrically combining the signals $r^k$, $\alpha_k$ and $Cp^k$ to obtain electrical signals $r^{k+1}$ representative of the sum of the residual vector represented by the signals $r^k$ and the negative product of the quotient represented by the signals $\alpha_k$ with the dot product represented by the signals $Cp^k$;

(k) electrically combining the signals $r^{k+1}$ and electrical signals $r^{k+1*}$, representative of the conjugate of the updated residual vector, to obtain electrical signals $\|r^{k+1}\|^2$ representative of a dot product;

(l) electrically combining the signals $\|r^{k+1}\|^2$ and $\|r^k\|^2$ to obtain electrical signal $\beta_k$ representative of the quotient of the dot product represented by the signals $\|r^{k+1}\|^2$ divided by the dot product represented by the signals $\|r^k\|^2$;

(m) electrically combining the signals $r^{k+1}$, $\beta_k$ and $p^k$ to obtain electrical signals $p^{k+1}$ representative of the sum of the updated residual vector represented by the signals $r^{k+1}$ and the product of the quotient represented by the signal $\beta_k$ with the relaxation vector represented by the signals $p^k$; and (n) substituting the signals $w^{k+1}$, $r^{k+1}$, $p^{k+1}$ and $\|r^{k+1}\|^2$ for the signals $w^k$, $r^k$, $p^k$ and $\|r^k\|^2$ in the above steps (e) through (n) and repeating the steps (e) through (n);

(o) electrically combining the final updated weight vector $w^{k+1}$ with the auxiliary signal vector to obtain electrical signal $s^T w^{k+1}$ representative of a dot product; and (p) electrically combining the signals s $w^{k+1}$ and the signals $s_o$ to obtain a signal $s_c$ representative of the sum, the signal $s_c$ being the combined output signal.

* * * * *